March 11, 1924.
J. R. McWANE
1,486,777
PRECALKED JOINT FOR CAST IRON PIPES AND METHOD OF MAKING SAME
Filed June 10, 1922      2 Sheets-Sheet 1
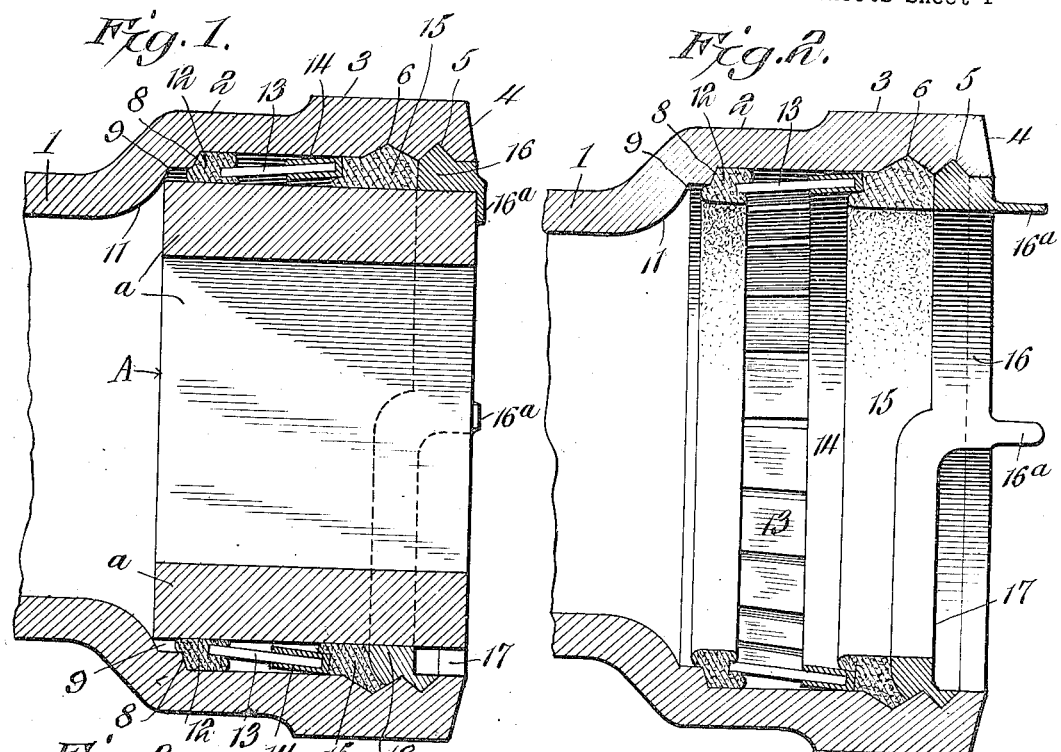
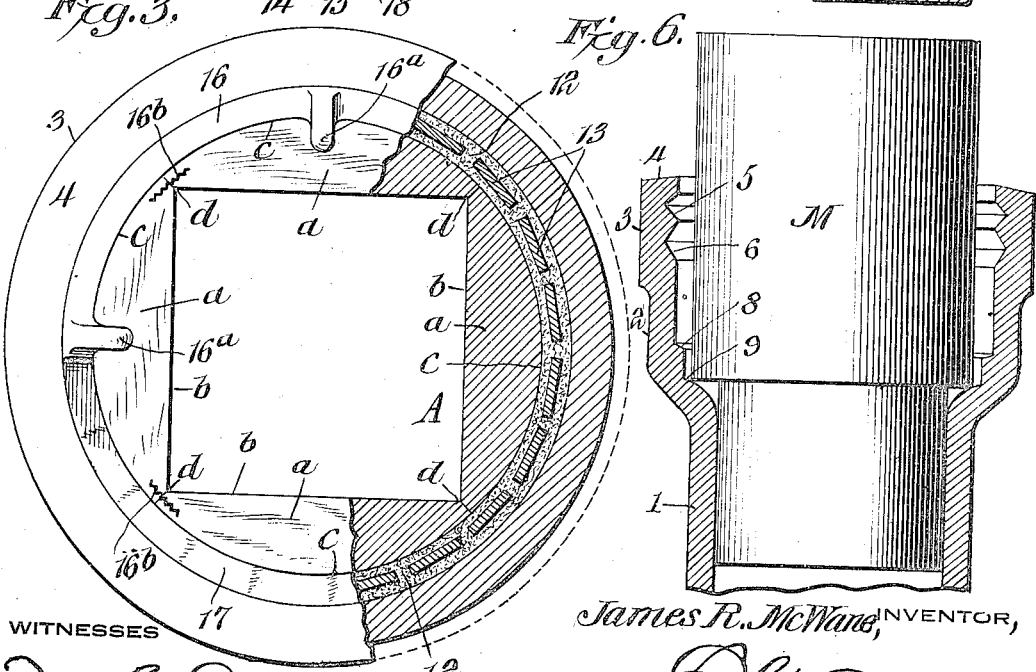
James R. McWane, INVENTOR, March 11, 1924.
J. R. McWANE
1,486,777
PRECALKED JOINT FOR CAST IRON PIPES AND METHOD OF MAKING SAME
Filed June 10, 1922    2 Sheets-Sheet 2
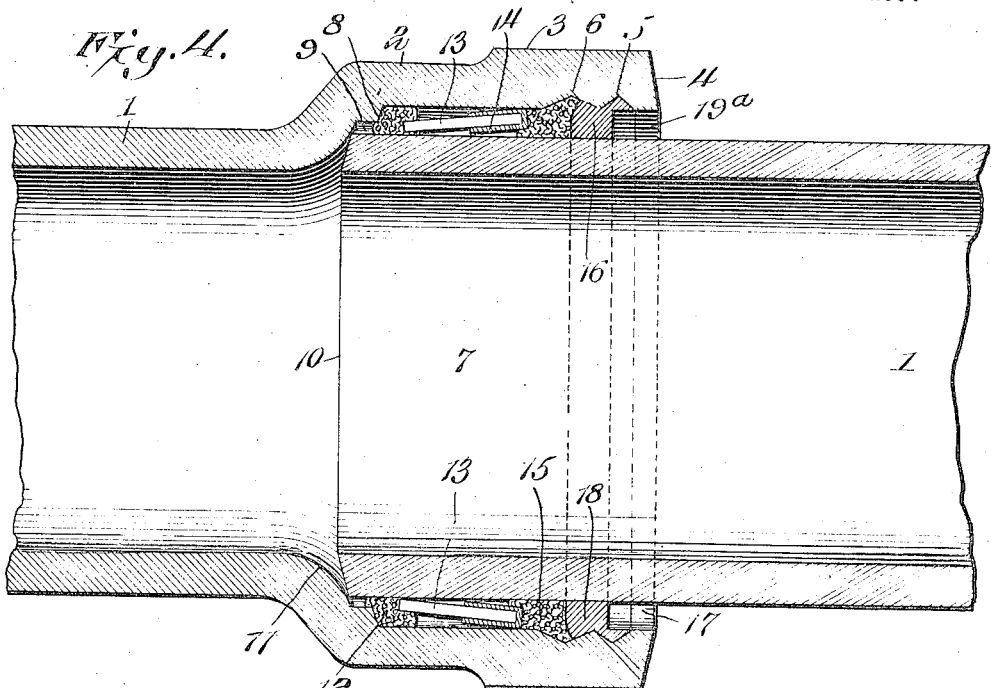
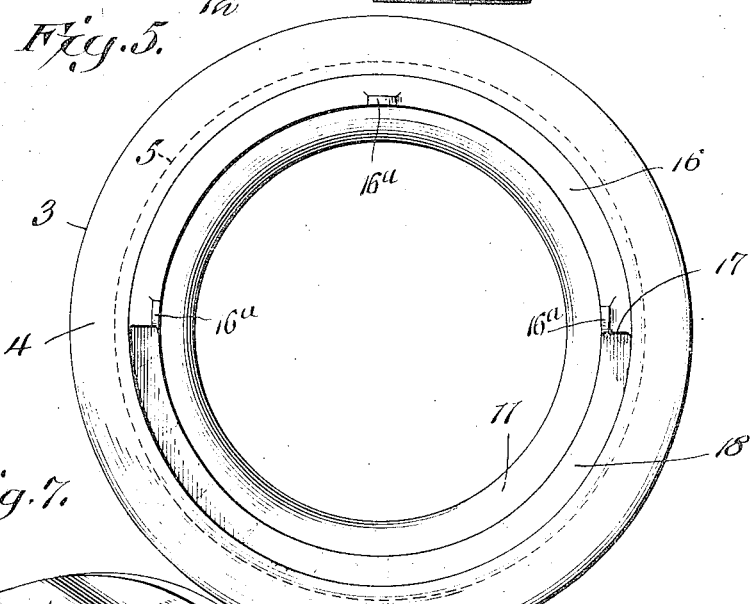
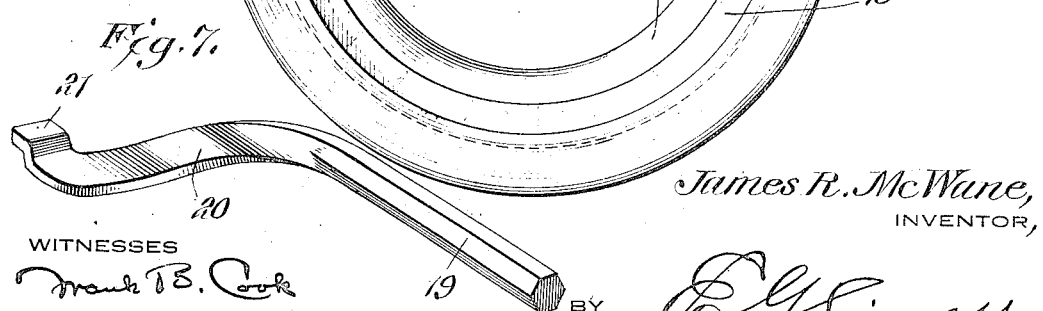
James R. McWane,
INVENTOR,
WITNESSES Patented Mar. 11, 1924.

1,486,777

UNITED STATES PATENT OFFICE.

JAMES R. McWANE, OF BIRMINGHAM, ALABAMA.

PRECALKED JOINT FOR CAST-IRON PIPES AND METHOD OF MAKING SAME.

Application filed June 10, 1922. Serial No. 567,334.

*To all whom it may concern:*

Be it known that I, JAMES R. McWANE, a citizen of the United States, residing at Birmingham, in the county of Jefferson and State of Alabama, have invented new and useful Improvements in Precalked Joints for Cast-Iron Pipes and Methods of Making Same, of which the following is a specification.

This invention relates to pipe joints for cast iron pipe, and particularly to that class known as prepared joints wherein the bell end of each section of pipe is equipped with means for securing a maximum tight joint when the pipe sections are connected in the field, such means being applied in position at the factory and shipped to the user ready to be easily, quickly and economically laid and connected in a trench or elsewhere.

The prime object of the present invention is to provide a joint for cast iron or other kinds of pipe of varying sizes, the elements for forming the joint being incorporated into the pipe at the factory or foundry, the usual and necessary lead ring or packing being securely anchored into the mouth of the bell end in proper position to receive the spigot end of an adjacent pipe section, such lead ring having already received the prime or principal calking around substantially one-half its exposed surface, such calked surface being on the underside of the pipe when in position in the trench, so that the only operation necessary to complete the joint is to properly insert the said spigot end into the adjacent bell and to calk the remaining upper half of the lead ring at the point of operation and to give a final touching up to the pre-calked side, such a pipe joint constituting what may be called a pre-calked joint, and obviating the necessity for the expensive digging of the usual bell holes or enlargements in the trench at each joint.

Another object is to provide a pre-calked joint of this character which, upon the completion of the operation as stated, will effectually prevent leakage at the joint and will, at the same time, permit of the necessary amount of flexing of the joint resulting from the unevenness generally present at the bottom of the trench, or other surface supporting the pipe line, the particular formation of the parts and arrangement thereof causing a compensation within the joint to take up the gap caused by flexing to maintain a tight joint and support the pipe sections rigidly together.

A full and complete understanding of the invention may be obtained from a consideration of the following detailed description, taken in connection with the accompanying drawings, forming a part of this specification, it being understood that while the drawings show a practical form of the invention, the latter is not confined to strict conformity therewith, but may be changed or modified so long as such changes or modifications mark no material departure from the salient features of the invention, as specifically pointed out in the appended claims.

In the drawings, in which similar reference characters designate corresponding parts throughout the several figures:

Figure 1 is a vertical, longitudinal section through the bell end of a pipe section having the improvements incorporated therein, a temporary plug or protector being shown in position within the joint.

Figure 2 is a similar view of the bell end, with the protector removed and disclosing the joint ready to receive the spigot end of an adjacent pipe.

Figure 3 is an end view, partly in section and showing the plug or protector in place.

Figure 4 is a longitudinal section through the bell end with the spigot end of an adjacent pipe section in position therein and the joint completed.

Figure 5 is an end elevation of the bell end of a pipe without the plug or protector.

Figure 6 is a longitudinal sectional view on a smaller scale, illustrating the use of a mandrel during the installation of the several rings in the bell of the pipe.

Figure 7 is a detail view of a calking tool for giving a final setting or calking to the underside of the joint.

In the laying of continuous pipe lines composed of connected sections of what is known as bell and spigot pipe, a great loss in time, labor and money is entailed by the digging of what are known as bell holes, which are nothing more than enlargements of the trench at regular intervals along the same and so spaced apart as to coincide with the joints of the pipe line, when connected together, to receive the enlarged bell ends of the pipe sections, and to provide room around the same to permit the workman to calk around the entire ring of lead which is used in all such pipe joints. In addition to this extra digging or excavating operation, the calking of the underside or half of the joint is in itself, a slow, laborious and expensive operation often slighted or indifferently done because of its difficulty, and these two items which, heretofore, in the ordinary method of laying pipe lines, have made the operations so costly, may be dispensed with by the use of the improvements herein shown and described.

The pipe 1 which is formed in the usual manner, is provided with the usual bell 2, enlarged to the desired diameter and having the customary thickened, terminal band or reinforcement 3 for strengthening the same. The outer face 4 of the bell is preferably slightly beveled, as shown, and the interior wall of the bell is provided with spaced anchoring grooves 5 and 6 located adjacent to the open end of the bell. The interior diameter is, of course, considerably larger than the outside diameter of the spigot end 7 of the pipe, and the wall thereof extends straight inwardly, except where broken by the grooves 5 and 6 to within a suitable distance from the shoulder formed by the bell end and is there reduced to provide an inwardly directed shoulder 8 whose face is bevelled towards the inner end of the bell, and the remainder of the socket, thus formed, is of less diameter than the outer portion of the same, to provide an annular space 9 in surrounding relation to the terminal 10 of the spigot, the latter having its end face bevelled slightly backward and adapted to strike against the rounded surface 11 where the interior diameter of the pipe proper flares outwardly and joins the inner walls of the socket adjacent to the shoulder 8 (Fig. 4).

Pipes having the aforesaid characteristics, generally, have been used before and are shown and described in certain patents issued to me, but the annular space or recess 9 is new and forms a very essential feature of the present invention, as it provides a substantial amount of clearance around the inner end of the spigot 7, and permits in conjunction with means about to be described, the adjacent pipe sections to flex to a maximum degree, while still maintaining a tight joint to prevent leakage.

In the preparation of the pre-calked joint at the foundry or factory, a mandrel M is introduced into the end of the bell and supported in spaced relation to the same, the inner end of the mandrel abutting against the aforesaid rounded wall or surface 11, and the outer diameter of the said mandrel being substantially equal to the outer diameter of the pipe proper so as to provide the proper space around the same for the application of the joint elements as follows.

A layer or ring 12 of braided hemp or any other suitable fibrous packing, is placed at the inner end of the socket to bear against the bevelled shoulder 8 and impinging against the interior wall of the socket and the outer face or wall of the said mandrel. Next a filler block formed of a series of iron wedges 13, carried at one end by a continuous strip of lead 14 and bent into a ring of suitable diameter is placed into the socket, around the mandrel with the free ends of the wedges bearing against the outer face of the hempen ring 12. These iron wedges 13 and their attachment to the lead ring carrying the same are shown and described in my prior Patents 1,288,092, and 1,270,309, and no particular claim is made thereto in this application.

A second layer or ring 15 of braided hemp or other fibrous material is then placed into the bell or socket, and is adapted to expand into and to fill the inner anchoring groove 6, and to bear against the outer face of the lead ring 14 and, finally, the lead ring 16 is poured into the remaining space to fill the outer anchoring groove 5 and to normally lie flush with the outer end face of the bell end of the pipe.

With the mandrel still in position within the bell, the lead ring 16 is calked substantially one-half the way around the same, as indicated at 17, and this calking, which may be done by any ordinary calking tool or otherwise, compresses the lead, as shown at 18, forcing the same to impinge into the adjacent hemp 15 and to partially enter into the inner groove 6 to form a double lock while, in the meantime, the wedges 13 have been forced longitudinally to enter and compress inner hempen ring 12.

By calking thus around one-half of the joint, the mandrel is necessarily offset slightly from the center, as will be readily understood, but this is just the effect desired, because when the pipe is socketed in the field and the calking is done on the top side to finish the joint, the spigot end of the pipe is then driven down to a seat on the pre-calked side, thus leaving the same centered with relation to the adjacent, coacting bell end. It has been deemed unnecessary to illustrate this offsetting of the parts in the drawings.

The construction of the parts, as thus far described, comprise all that is essential to the present invention, though for the purpose of elucidation, the manner of shipment of the pipe sections is illustrated in Figure 1 of the drawings.

After the aforesaid mandrel M has been withdrawn from the socket formed in the bell end of the pipe as above described, it is then ready for shipment, and in order to protect the soft lead and hempen rings comprising elements of the joint, which are more or less easily damaged, a plug or protector A is introduced into the socket to be frictionally held therein against accidental dislodgment during transit, and when arrived upon the scene of operations, and the pipe is to be jointed to another pipe, the said plug or protector is withdrawn from its engagement with the bell prior to the introduction of the spigot end of the next adjacent pipe section.

The plug or protector comprises a series of staves $a$ of an external diameter to snugly fit within the hemp and lead rings and extend from the rounded wall 11 of the socket outwardly to a point substantially flush with the outer face of the lead ring 16, so as to prevent the latter from accidentally coming into contact with anything which might dent or otherwise disrupt or injure the same, and at the same time the plug maintains the several joint elements in their proper positions within the socket. The staves $a$, which are preferably formed of some cheap grade of wood, have their inner faces flat, as at $b$, and their outer faces $c$ curved on the arc of a circle of a diameter equal to the internal diameters of the rings 12, 15 and 16 and their ends $d$ bevelled so that, when the staves are in position in the bell and ready for shipment, the said bevelled edges $d$ abut against each other and are radially disposed, with relation to the axis of the pipe, their outer curved faces forming a complete circle fitting the several rings and frictionally engaging the same, the inner flat faces $b$ forming an opening to facilitate the removal of the staves.

The lead ring 16 is preferably formed, at diametrically opposite points, with integral, outstanding tongues $16^a$ which are adapted to be bent inwardly and across the center portions of the ends of the staves $a$ to hold the same in position within the bell of the pipe. In addition to the tongues $16^a$, the staves $a$ are secured together at their abutting, bevelled edges, with corrugated metal or other fasteners $16^b$, as shown in Figure 3 of the drawings. By bending said tongues $16^a$ outwardly the staves $a$ may be readily removed from within the bell.

When the pipe is laid in the trench or other surface for supporting the same, the pre-calked side 17 of the lead ring is placed beneath, and the spigot end of the next adjacent pipe is then introduced into the same, and since there is no necessity for any further heavy calking on this portion of the joint, it will be seen that there is no necessity for the formation of the aforesaid bell holes, a smooth bottom, straight away trench being all that is necessary to prepare, thus resulting in a great saving in the excavation operations.

After the spigot end has been introduced into the socket with the terminal thereof abutting against the rounded wall 11, the upper half of the lead ring 16 is then calked, as indicated at $19^a$, which forces the spigot end down to a seat upon the pre-calked side, thus overcoming the aforesaid offset feature, leaving the spigot concentric with the socket and producing a tight joint around the same, the tongues $16^a$ being driven back into the lead ring.

A final setting or light calking of the lead ring on the pre-calked underside of the joint is given before the operation is completed. In order to reach this portion, since there is no bell hole or pit present, the peculiarly formed double-offset calking tool shown in Figure 7 may be used. This tool comprises a shank 19 adapted to be hammered on one end thereof, in the usual manner, the other end terminating in a downwardly and inwardly curved portion 20 having a calking head 21 formed at the end which contracts with the lead and may reach, by reason of the curved portion 20, to the bottom of the pipe or the center of the pre-calked portion 18 of the lead ring, when the shank 19 of the tool is located at one side of the pipe and in position to be hammered, it being understood that said calking tool will be made in rights and lefts, the dimensions depending on the size of the pipe, and used on opposite sides sides thereof to give the joint this final calking.

One pipe may freely flex to a certain extent with relation to the other by reason of the annular space 9 immediately surrounding the inner end of the spigot, and while such a recess has been used heretofore in bells of cast iron pipe, there has been practically no clearance between the bell and and spigot at this point, the recess being generally used for centering the pipe in the bell only. In the aforementioned patents, the iron wedges 13 were shown extending to the bottom of the socket in the bell, and one of the disadvantages of such arrangement was that the wedges had a tendency to wedge the spigot end of the pipe off or away from its seat at the bottom of the socket as the joint was driven up. This is done away with by the provision of the inner ring of hemp 12 against which the inner free ends of the wedges impinge, which prevents the driving of the pipe off or outwardly, because the end of the pipe is down in the recess, and neither the wedges nor the hemp can get down under the end of the spigot to wedge it outwardly. In addition to this, the inner ring of hemp 12 tends to make the joint more rigid, by reason of the expansive tendency of the same which will follow the end of the spigot in its flexing and close all space around the same and when the pipes become flexed, as when some inequality in the supporting surface of the trench, etc. is encountered, the spigot end will tend to compress the hemp 12 in a transverse direction which will result in an expansion of the same in a direction longitudinally of the pipe thus moving the wedges around that portion of the joint in a lengthwise manner, to impart a compressing action upon the other or outer hempen ring 15 which, in turn, is then compressed against the outer lead ring 16 and caused to hug the sides of the spigot all the tighter, thus preventing any possibility of leakage, even though the pipes may be flexed in any direction with relation to each other.

From the foregoing it will be seen that a simple, cheaply manufactured cast iron pipe has been provided, having means for forming the joints between the sections thereof in the trench or on other locations, the major portion of the work of forming the joint being done at the factory, thus resulting in a great saving in the cost of preparing the trench or other location for the pipe line by eliminating the necessity for digging the bell holes or spaces for each bell end to lie in, and also eliminating the expensive operation of calking the under half of the joint, which ordinarily has to be done in said bell holes and which, by reason of the difficulty thereof, is often indifferently done or neglected, resulting sooner or later, in a leaky line.

What is claimed is:—

1. A prepared joint for pipe, comprising bell and spigot portions, with a series of filler blocks constituting a backing for the sealing material, fibrous packing material lodged against the filler blocks, and sealing lead at the mouth end of the joint in compacting relation to the fibrous packing material, said lead having substantially one-half of its circumference calked, by compressing the lead against the fibrous packing material.

2. A prepared joint for pipe, comprising bell and spigot portions, with a series of filler blocks constituting a backing for the sealing material, fibrous packing material lodged against the filler blocks, sealing lead at the mouth end of the joint in compacting relation to the fibrous packing material, and a ring of fibrous packing material at the inner end of the bell against which the filler blocks are adapted to bear.

3. A prepared joint suitable for pipe, comprising bell and spigot portions, with a series of filler blocks, a shoulder at the inner end of the bell, fibrous material bearing against said shoulder, the said filler blocks bearing against said fibrous material, other fibrous material on the other side of the filler blocks and bearing against the same, and lead sealing material at the mouth end of the bell in compacting relation to the last-mentioned fibrous sealing material.

4. A bell and spigot joint, wherein the bell end is provided with a plurality of grooves near the mouth thereof, fibrous packing material engaged in one of said grooves, lead packing material engaging in another of said grooves and bearing against one side of the fibrous material, filler blocks bearing against the other side of said fibrous packing material, and other fibrous packing material at the inner end of the bell against which the filler blocks have a bearing.

5. A bell and spigot joint, wherein the bell end is provided with a shoulder near the inner end of the bell, and an annular recess at the inner end of the bell beyond the said shoulder, and the spigot end has its inner end inserted within the bell and is spaced by the said annular recess from the inner wall of the bell, thereby providing a clearance around the inner end of the spigot so as to permit the pipe sections to flex to a maximum degree while still maintaining a tight joint.

6. A bell and spigot joint, wherein the bell end is provided with an annular recess at the inner end of the bell, a bevelled shoulder in advance of said recess, and a packing fitted within the bell and bearing against said shoulder, and the spigot end has its inner end inserted within the bell and is spaced from the inner wall thereof by the said annular recess, with said packing engaging the spigot in advance of its inner end.

7. A prepared joint for bell and spigot pipes, provided with a sealing lead at the mouth end of the joint, said sealing lead being pre-calked for a portion of its circumference approximately one-half.

8. In a joint for bell and spigot pipes, the spigot end provided with grooves near the mouth end, fibrous packing and lead material fitted in said grooves, said lead material being pre-calked for a portion of its circumference by forcing the lead material backwardly against the packing.

9. A pre-calked joint for cast iron pipes, comprising the bell and spigot portions of two adjacent pipe sections, the bell being adapted to receive the spigot, an annular shoulder near the inner end of the bell, spaced annular anchoring grooves formed in the bell adjacent to the mouth of the bell, fibrous packing material fitting in one of the grooves, other fibrous packing material fitting against the shoulder, filler blocks located between said packing material, and a lead ring fitted in the mouth of the bell and anchored in the outer groove, said ring being calked or driven inwardly around substantially half of its circumference, the remaining uncalked portion being adapted to be similarly calked after the joint is made in the trench.

10. A pre-calked joint for cast iron pipes, comprising the bell and spigot portions of two adjacent pipe sections, the bell being adapted to receive the spigot and having a rounded abutment for the latter to impinge, an annular shoulder near the inner end of the bell to produce a reduced annular space around the inner terminal of the spigot to allow full flexing of the joint, spaced annular anchoring grooves formed in the bell adjacent to the mouth of the bell, fibrous packing material fitting in one of the grooves, other fibrous packing material fitting against the shoulder, filler blocks located between said packing material, and a lead ring fitted in the mouth of the bell and anchored in the outer groove, said ring being calked or driven inwardly around substantially half of its circumference.

11. The method of forming pre-calked joints for bell and spigot pipes, consisting in inserting a mandrel within the bell end of one of the pipes and supporting the same in spaced relation, with the inner end of the mandrel abutting the inner end of the bell, then placing packing material within the bell and between it and the mandrel, then pouring lead material into the outer end of the space between the mandrel and the bell so as to cause it to engage the packing material, and then with the mandrel still in position calking the lead material substantially half way around by pressing the lead and forcing the same into the adjacent packing material.

12. The method of forming pre-calked joints for bell and spigot pipes, wherein the bell end is provided with a plurality of interior grooves, consisting in inserting a mandrel within the bell end of one of the pipes and supporting the same in spaced relation, with the inner end of the mandrel abutting the inner end of the bell, then placing packing material within the bell and between it and the mandrel and causing it to fill in one of the grooves, then pouring lead material into the outer end of the space between the mandrel and the bell so as to cause it to engage the packing material, and then with the mandrel still in position, calking the lead material substantially half way around by pressing the lead and forcing the same into the adjacent packing material, until the lead material occupies a part of the groove with the packing material.

13. The method of joining bell and spigot pipes wherein the bell end is provided with a lead ring at the mouth of the bell, said lead ring being pre-calked around one-half of its exposed surface, which consists in positioning the spigot end of one pipe in the bell end of an adjacent pipe at the bottom of the trench, with the pre-calked portion of the lead ring on the bottom side of the bell, then giving the upper side of the ring a heavy calking, and finally inserting a curved calking tool around the lower side of the pipe to give the pre-calked lead a final setting.

14. A prepared joint for bell and spigot pipes, provided with a sealing lead at the mouth end of the joint, said sealing lead being provided with bendable tongues formed thereon.

In testimony that I claim the foregoing as my own, I have hereto affixed my signature.

JAMES R. McWANE.